United States Patent Office 3,595,881
Patented July 27, 1971

3,595,881
PROCESS FOR SEPARATING ENANTIOMERS OF (CIS-1,2-EPOXYPROPYL)PHOSPHONIC ACID
Richard F. Shuman, Westfield, N.J., assignor to
Merck & Co., Inc., Rahway, N.J.
No Drawing. Filed May 15, 1968, Ser. No. 729,404
Int. Cl. C07d 1/20
U.S. Cl. 260—348
9 Claims

ABSTRACT OF THE DISCLOSURE

Mixtures of (+) and (−) (cis-1,2-epoxypropyl)-phosphonic acid or a salt thereof are reacted with a metal salt of an optically-active acid or with a metal salt of a mixture of optically-active acid enantiomers to produce a metal salt of (cis-1,2-epoxypropyl)phosphonic acid containing a greater proportion of one of the enantiomers of (cis-1,2-epoxypropyl)phosphonic acid. The process is useful for preparing mixtures of the enantiomeric forms of (cis-1,2-epoxypropyl)phosphonic acid containing a greater proportion of the (−) enantiomer, which is an antibiotic substance active against various gram-positive and gram-negative pathogens.

BACKGROUND OF THE INVENTION

It has been found that (−) (cis-1,2-epoxypropyl)-phosphonic acid is a valuable antibiotic which is active in inhibiting the growth of various *Bacillus, Escherichia, Staphylococci, Salmonella* and *Proteus* pathogens and antibiotic resistant strains thereof. This antibiotic can be produced by synthesis by procedures which result in the production of the racemic form consisting of a mixture of equal amounts of both the (+) enantiomer, which is devoid of antibiotic activity, and the (−) enantiomer, which has antibiotic activity. While such mixtures are useful as antibiotics, methods have been sought whereby the content of the (−) enantiomer might be increased or this isomer obtained in substantially pure form and free from the inactive form.

SUMMARY OF THE INVENTION

It is an object of this invention to provide a method of converting mixtures of (cis-1,2-epoxypropyl)-phosphonic acid enantiomers to more active mixtures containing a greater proportion of the (−) enantiomer. Another object is to provide a method of preparing a salt of (cis-1,2-epoxypropyl)phosphonic acid enantiomers containing a greater proportion of the (−) enantiomer. Other objects will be apparent from the detailed description of this invention hereinafter provided.

In accordance with this invention, it is now found that mixtures of (cis-1,2-epoxypropyl)phosphonic acid enantiomers or salts thereof can be reacted with a metal salt of an optically-active acid or with a metal salt of a mixture of optically-active acid enantiomers and a mixture of enantiomeric metal salts having a greater proportion of one of the optically-active forms of (cis-1,2-epoxypropyl)phosphonic acid can be recovered from the resulting reaction product. Thus, by this invention, mixtures of the optically-active forms of (cis-1,2-epoxypropyl)phosphonic acid can be partially or completely resolved. This process involves a selective transfer of a cation of the optically-active acid to one of the enantiomers and the separation of the resulting salt from the reaction mixture. The separated salt so obtained contains a preponderance of one of the enantiomers and the solution from which the salt is separated contains a greater proportion of the other isomer than was present in the original enantiomeric mixture.

In carrying out the process of this invention, a solution of a metal salt of an optically-active acid is added to a solution containing a mixture of both enantiomeric forms of (cis-1,2-epoxypropyl)phosphonic acid or a salt thereof, resulting in the preferential formation of the metal salt of one of the enantiomers, which precipitates from the solution and can thus be separated and recovered by physical means such as filtration of centrifugation. The solution remaining after this separation can then be treated to obtain the other enantiomer. The degree of separation which can be achieved by the process of this invention will depend upon a number of factors, such as the relative amounts of the enantiomers present in the mixture being separated, the specific solvent used, the selectivity of the transfer of the cation, and the relative concentrations of the enantiomers in the solutions.

Any metal salt of the optically-active acids whose cation is preferentially transferred to one or the other enantiomer of (cis-1,2-epoxypropyl)phosphonic acid can be used in carrying out the processes of the present invention. Thus, salts of optically-active acids that might be mentioned are alkali metal salts, particularly lithium, sodium or potassium salts; alkaline earth metal salts, particularly magnesium, calcium, strontium or barium salts; transition heavy metal salts, particularly titanium, chromium, tungsten, manganese, iron, cobalt, nickel, copper, zinc, cadmium or mercury salts in any of their various positive valence states; and other metal salts such as those of aluminum, tin or lead.

While the processes of this invention are generally useful for the separation or concentration of one of the enantiomers, it is especially useful in treating racemates of (cis-1,2-epoxpropyl)phosphonic acid or a salt thereof to obtain either the (−) isomer in substantially pure form or mixtures of the isomers containing enhanced amounts of the (−) isomer. The racemate form is the usual form of (cis-1,2-epoxypropyl)phosphonic acid obtained, for example, by the epoxidation of cis-propenylphosphonic acid.

In carrying out the process of this invention, various optically-active acids such as substituted and unsubstituted alkyl, alkenyl, alkynyl, cycloalkyl, cycloalkenyl, cycloalkynyl, mono- and polycarboxylic, thiocarboxylic, dithiocarboxylic, arsinic, arsonic, borinic, boronic, phosphinic, phosphonic, selenous, selenic, antimonic, antimonous, sulfonic and sulfinic acids can be used. Examples of optically-active acids useful in the process of this invention that might be mentioned are (+)-tartaric acid, (−)-tartaric acid, (+)-gluconic acid, (+) - mannonic acid, (+)-lactic acid, (−)-malic acid, (+)-glutamic acid, (+)-talo-mucic acid, (+) - saccharic acid, (+)-trihydroxylglutaric acid, (−)-gulonic acid, (+)-alanine, (−)-serine, (+)-valine, (−) - aspartic acid, (−) - leucine, (+)-isoleucine, (+) - mandelic acid, (−)-mandelic acid, (+)-camphor-10-sulfonic acid and the like. Alternatively, a metal salt of a mixture of optically-active acid enantiomers, for example, a racemic mixture, can be used in the processes of this invention.

The reaction of the (cis-1,2-epoxypropyl)-phosphonic acid isomers and the metal salt of the optically-active acid is effected in a solvent medium from which the metal salt of one of the (cis-1,2-epoxypropyl)phosphonic acid isomers precipitates. This salt is then conveniently recovered, for example, by filtration or centrifugation. The salt so recovered contains a preponderance of one of the enantiomers and from the solution, after separation of the precipitated product, is obtained a product having a preponderance of the other enantiomer. Suitable solvents for carrying out the processes of this invention that might be mentioned are water, aqueous lower alkanols, lower alkanols, and the like, as well as aprotic solvents having a significant dielectric constant such as N,N-dimethylformamide, dimethylsulfoxide, tetrahydrothiophene dioxide, and the like. Alternatively, the process is effected in a mixture of these solvents or in a mixture of these solvents with other miscible solvents.

In the process of this invention, it is preferred to use a molar amount of the metal salt of the optically-active acid not substantially in excess of about ½ mole per mole of (cis-1,2-epoxypropyl)phosphonic acid. This will avoid or minimize the concomitant precipitation of the second enantiomer from the solution. The temperature at which the reaction is run is not critical and the optimum temperature will depend upon the solvent and the particular salt of the optically-active acid being used. Thus, the reaction can be carried out at temperatures between about 0° C. and 100° C., although generally it is preferred to use temperatures ranging from about 20° C. to about 80° C. in order to obtain maximum yields of the desired products under optimum conditions.

In carrying out the process of this invention, either the mixture of the (+) and (−) isomers of (cis-1,2-epoxypropyl)phosphonic acid can be used or a salt of these mixed isomers, such as an amine salt, an ammonium salt or an alkali metal salt. The precise nature of the salt is not critical, and any salt can be utilized which will permit the preferential transfer of the cation of the optically-active acid and which will keep the optically-active acid and one of the enantiomers soluble in the reaction mixture.

The following examples are presented to illustrate processes of this invention:

Example 1

A solution of 4.9 g. (0.02 mole) of racemic monobenzylammonium (cis-1,2-epoxypropyl)phosphonate in 50 ml. of water is adjusted to pH 9.0 with 5% sodium hydroxide and heated to 80° C. To this solution is added with stirring a solution of 4.3 g. (0.01 mole) of calcium (+)-gluconate monohydrate in 125 ml. of water, also heated to 80° C. The resulting reaction mixture is kept at about 80° C. with stirring for about 5 minutes, then filtered and the filter cake washed with 45 ml. of hot water. The washed product is dried at 50° C. in vacuo to afford calcium (cis-1,2-epoxypropyl)phosphonate monohydrate having $$[\alpha]_{405}^{28} \, m\mu. = -0.9°$$

(c.=5%, 0.4 M ethylenediamine tetraacetic acid at pH 8.8).

Example 2

Racemic monobenzylammonium (cis-1,2-epoxypropyl)phosphonate, 4.9 g. (0.02 mole), is dissolved in 50 ml. of water and the pH of the solution adjusted to 9.0 with 5% sodium hydroxide. To this solution, heated to 80° C., is added a heated solution at 80° C. of 3.1 g. (0.01 mole) of calcium (−)-lactate pentahydrate in 90 ml. of water with stirring. The resulting solution is maintained at 80° C. for about 5–10 minutes with stirring and then filtered. The filter cake is washed with 50 ml. of hot water and then dried in vacuo at 50° C. to afford calcium (cis-1,2-epoxypropyl)phosphonate monohydrate having $$[\alpha]_{405}^{28} \, m\mu. = +0.9°$$

(c.=5%, 0.4 ethylenediamine tetraacetic acid at pH 8.8).

Example 3

The combined filtrate and mother liquors from the isolation of partially resolved calcium (+) (cis-1,2-epoxypropyl)phosphonate monohydrate described in Example 2 is adjusted to pH 9.0 with 6 N sodium hydroxide. Calcium acetate (1.76 g., 0.01 mole) is added to the solution and the resulting mixture stirred for 30 minutes at 25° C. The mixture is filtered, the cake washed with 45 ml. of water and the partially resolved calcium (−) (cis-1,2-epoxypropyl)phosphonate monohydrate dried in vacuo at 50° C.

Example 4

Cupric (−) (cis-1,2-epoxypropyl)phosphonate monohydrate.—Racemic monobenzylammonium (cis-1,2-epoxypropyl)-phosphonate, 4.9 g. (0.02 mole), is added to a solution of cupric (+)-gluconate monohydrate, 4.72 g. (0.01 mole), in 15 ml. of water. The mixture is stirred at room temperature for 15 minutes, the pH adjusted to 9 with 10% sodium hydroxide and the mixture stirred an additional 15 minutes at 80° C. The hot mixture is filtered and the bluish product washed with 15 ml. of hot methanol. The precipitated cupric (cis-1,2-epoxypropyl)phosphonate monohydrate is dried at 50° C. in vacuo to afford product having $$[\alpha]_{405}^{28} \, m\mu. = -2.5°$$

(c.=5%, 0.4 M ethylenediamine tetraacetic acid at pH 8.8).

Example 5

Preparation and separation of cupric (+) and (−) (cis-1,2-epoxypropyl)phosphonate monohydrate.—A solution of racemic monobenzylammonium (cis-1,2-epoxypropyl)phosphonate (9.8 g., 0.1 mole) in 100 ml. of cold water is passed into a jacketed glass column with an inside diameter of two inches and holding 800 ml. of 100–300 mesh epoxy-polyamine ion exchange resin, which contains (−)-phenylalanine residues on the cupric cation ($Cu^{++}$) cycle. The column is then washed at the rate of 20 ml. per minute with a total of 3 liters of water. The first 1.5 liters of effluent is collected separately, frozen and lyophilized in vacuo at 100–250 microns. The light blue powder remaining is partially resolved cupric (+) (cis-1,2-epoxypropyl)phosphonate monohydrate.

The second 1.5 liters of effluent are treated similarly to give partially resolved cupric (−) (cis-1,2-epoxypropyl)phosphonate monohydrate.

Each partially resolved cupric phosphonate is passed over the resin column again in an identical manner in 10 parts of water with 3 liters of water wash. Lyophilization of the first 1.5 liters of effluent from repassing partially resolved cupric (+) (cis-1,2-epoxypropyl)phosphonate monohydrate through the ion exchange resin column gives cupric (+) salt of a high degree of optical purity.

Similarly, by retreating cupric (−) (cis-1,2-epoxypropyl)phosphonate, cupric (−) salt of a high degree of optical purity is obtained.

Example 6

Racemic monobenzylammonium (cis-1,2-epoxypropyl)phosphonate, 4.9 g. (0.02 mole), is dissolved in 50 ml. of 90% methanol. To this solution is added finely-powdered magnesium (+)-lactate trihydrate, 2.56 g. (0.01 mole). The mixture is stirred for 3 hours at 25° C. The solids are filtered, washed with 10 ml. of methaonl and dried to give predominantly magnesium (−) (cis-1,2-epoxypropyl)phosphonate dihydrate.

To the combined mother liquors and washings is added magnesium oxide, 0.4 g. (0.1 mole), and the resulting solution is stirred for 18 hours at 25° C. The solids are filtered, washed with 10 ml. of methanol and dried to give partially resolved magnesium (+) (cis-1,2-epoxypropyl)phosphonate dihydrate.

Example 7

Racemic monobenzylammonium (cis-1,2-epoxypropyl)phosphonate, 1.0 g. (0.00408 mole), is dissolved in 10 ml. of water. To this solution is added racemic calcium lactate pentahydrate, 0.94 g. (0.00304 mole), dissolved in 13 ml. water. The pH of the resulting solution is adjusted to 8.5 by the dropwise addition of 2.5 N sodium hydroxide solution. The resulting solution is stirred at 25° C. for 30 minutes and the precipitate is filtered. The filter cake is washed with 5 ml. of water and dried in vacuo to constant weight to give 0.55 g. of partially resolved calcium (—) (cis-1,2-epoxypropyl)phosphonate monohydrate having $$[\alpha]_{405}^{28°} \, m\mu. = -1.41°$$

(c.=5%, 0.4 M ethylenediamine tetraacetic acid at pH 8.8).

Racemic (cis-1,2-epoxyphosphonic acid is prepared by selectively reducing 1-propynylphosphonic acid to produce cis-propenylphosphonic acid and epoxidizing this intermediate product. For example, the racemate is prepared by the following detailed procedures:

The sodium salt of cis-propynylphosphonic acid (1.2 g., .01 mole) is dissolved in 30 ml. of water containing 1.67 ml. of piperidine, 83 mg. of zinc acetate and 0.3 g. of Raney nickel and the mixture hydrogenated at 40 p.s.i. One equivalent of hydrogen is absorbed during 1¼ hours. The catalyst is filtered off, the filtrate passed through a column containing 10 g. of DOWEX 50 on the acid cycle, and the column eluted with water. The combined eluates are neutralized to a pH of about 5.5 with sodium hydroxide solution and after removal of the water in vacuo, the monosodium salt of cis-propenylphosphonic acid is obtained as an amorphous residue. The product is characterized by infrared and NMR spectra.

Cis-propenylphosphonic acid (.50 g., 0.41 mole), prepared by neutralizing the sodium salt with hydrochloric acid, is dissolved in 0.5 ml. of water and the solution neutralized to pH 5.5 by careful addition of ammonium hydroxide. Sodium tungstate (10 mg., .00034 mole) is added, and the mixture is heated to 55° C. on a water bath. Hydrogen peroxide (0.5 cc.) is heated and the heating continued for 1½ hours. The reaction mixture is then cooled to room temperature and the solvent removed by freeze-drying. The residue is dissolved in 50 ml. of methanol and the insoluble inorganic material filtered off. Upon concentration of the solution, crystalline ammonium salt of racemic (cis-1,2-epoxypropyl)phosphonic acid is obtained. The product is characterized by its infrared and NMR spectra.

The ammonium salt of racemic (cis-1,2-epoxypropyl) phosphonic acid is converted to the monobenzylamine salt as follows:

To a methanolic solution of 252 mg. of the ammonium salt is added 154 mg. of benzylamine. The resulting solution is evaporated at 60° C. in a stream of nitrogen to remove ammonia and the residue is taken up in a small volume of methanol and cooled, whereupon monobenzylammonium (cis - 1,2 - epoxypropyl)phosphonate crystallizes. The crystalline product is recovered by filtration, washed with a small volume of cold n-propanol and dried in vacuo at 60° C. M.P. 155–157° C.

Racemic and levorotatory (cis-1,2-epoxypropyl)phosphonic acid and its salts are useful antimicrobial agents, which are active in inhibiting the growth of both gram-positive and gram-negative pathogenic bacteria. The (—) form, and particularly its salts, are active against Bacillus, Escherichia, Staphylococci, Salmonella and Proteus pathogens and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, racemic and levorotatory (cis-1,2-epoxypropyl)phosphonic acid and salts thereof can be used as antiseptic agents to remove susceptible organisms from pharmaceutical, dental and medical equipment and other areas subject to infection by such organisms. Similarly, they can be used to separate certain microorganisms from mixtures of microorganisms. Salts of (—) (cis-1,2-epoxypropyl)phosphonic acid are also useful in the treatment of diseases caused by bacterial infections in man and animals and are particularly valuable in this respect, since they are active against resistant strains of pathogens. These salts are especially valuable, since they are effective when given orally, although they can also be administered parenterally. The salts of levorotatory and racemic (cis-1,2-epoxypropyl)phosphonic acid are useful as preservatives in industrial applications, since they effectively inhibit undesirable bacterial growth in the white water used in paper mills and in paints, for example, in polyvinyl latex paints.

The dextrorotatory enantiomer of (cis-1,2 - epoxypropyl)phosphonic acid can be converted to cis-propenylphosphonic acid by heating with potassium thiocyanate in aqueous methanol. The cis-propenylphosphonic acid thus obtained can be used as a starting material in the processes described herein to produce the levorotatory enantiomer of (cis-1,2-epoxypropyl)phosphonic acid.

If desired, the (+) (cis-1,2-epoxypropyl)phosphonic acid can be converted to the antibacterially active (—) enantiomer by splitting the epoxide ring of a salt of the (+) compound by reaction with trifluoroacetic acid to form the [1 - hydroxy-2-(trifluoroacetoxy)propyl]phosphonate salt, reacting this compound with methanesulfonyl chloride in a mixture of methylene chloride and anhydrous pyridine to produce the [1-(methanesulfonyloxy) - 2 - (trifluoroacetoxy)propyl]phosphonate salt, and treating this product in methanol solution with sodium hydroxide to produce the (—) (cis - 1,2 - epoxypropyl) phosphonate salt.

(—) (cis - 1,2 - epoxypropyl)phosphonic acid can be represented structurally as follows:

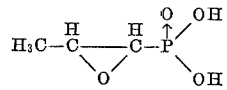

The (—) indicates that this phosphonic acid rotates plane-polarized light in a counterclockwise direction (to the left as viewed by the observer) when the rotation of its disodium salt is measured in water (5% concentration) at 405 mµ. The designation cis used in describing the 1,2-epoxypropylphosphonic acid compound means that the hydrogen atoms attached to carbon atoms 1 and 2 of the propylphosphonic acid are on the same side of the oxide ring.

The structural formula of this antibiotic substance has been shown in the planar formula for the sake of convenience. However, the antibiotic can also be depicted spatially as follows:

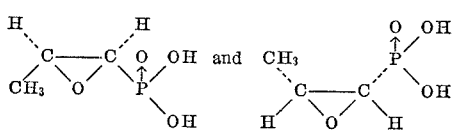

What is claimed is:

1. A process for separating enantiomers of (cis-1,2-epoxypropyl)phosphonic acid which comprises reacting at a temperature of from 0–100° C. an amine salt, ammonium salt, or alkali metal salt of a mixture of (+) and (—) enantiomers of (cis - 1,2 - epoxypropyl)phosphonic acid in a solvent selected from the group consisting of water, aqueous loweralkanols, and loweralkanols with a metal salt selected from the group consisting of calcium, copper, and magnesium of an optically active acid selected from the group consisting of (+)-gluconic acid, (—)-lactic acid, (+)-lactic acid, and (—)-phenylalanine or the metal salt of optically active acid enantiomers thereof and recovering the metal salt of (cis-1,2-epoxypropyl)phosphonic acid having a greater proportion of (—) enantiomer from the resulting reaction mixture by filtration or centrifugation.

2. The process of claim 1 wherein the mixture of enantiomers is racemic (cis-1,2-epoxypropyl)phosphonic acid.

3. The process of claim 1 wherein the metal salt of the optically-active acid is a calcium salt.

4. The process of claim 1 wherein the metal salt of the optically-active acid is the calcium salt of lactic acid.

5. The process of claim 4 wherein the reaction is effected in water.

6. The process of claim 1 wherein the metal salt is calcium (+)-gluconate.

7. The process of claim 6 wherein the reaction is carried out in aqueous solution.

8. The process of claim 1 wherein the metal salt is cupric (+)-gluconate.

9. The process of claim 1 wherein the salt of the mixture of enantiomers of (cis-1,2-epoxypropyl)phosphonic acid is the monobenzylamine salt.

References Cited

UNITED STATES PATENTS 2,688,018   8/1954   Cosulich _____ 260—251.5

NORMA S. MILESTONE, Primary Examiner

U.S. Cl. X.R.

260—999, 956